United States Patent
Nishijima

(10) Patent No.: US 7,863,793 B2
(45) Date of Patent: Jan. 4, 2011

(54) FIELD ELEMENT CORE

(75) Inventor: Kiyotaka Nishijima, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 127 days.

(21) Appl. No.: 12/226,914

(22) PCT Filed: May 21, 2007

(86) PCT No.: PCT/JP2007/060387

§ 371 (c)(1),
(2), (4) Date: Oct. 31, 2008

(87) PCT Pub. No.: WO2007/136041

PCT Pub. Date: Nov. 29, 2007

(65) Prior Publication Data

US 2009/0102306 A1   Apr. 23, 2009

(30) Foreign Application Priority Data

May 24, 2006   (JP) .............................. 2006-144410

(51) Int. Cl.
*H02K 1/27* (2006.01)
(52) U.S. Cl. .............................. 310/156.57; 310/156.53
(58) Field of Classification Search ..............................
310/156.53–156.57; H02K 1/22, 1/27, 1/28, H02K 21/14
See application file for complete search history.

(56) References Cited

U.S. PATENT DOCUMENTS

| | | | | |
|---|---|---|---|---|
| 5,097,166 A * | 3/1992 | Mikulic | ................. | 310/156.83 |
| 6,008,559 A * | 12/1999 | Asano et al. | ........... | 310/156.53 |
| 6,703,744 B2 * | 3/2004 | Yoshinaga et al. | ..... | 310/156.45 |
| 6,794,784 B2 * | 9/2004 | Takahashi et al. | ...... | 310/156.56 |
| 6,858,961 B2 * | 2/2005 | Tagome et al. | ......... | 310/156.56 |
| 6,946,766 B2 * | 9/2005 | Gary et al. | ............. | 310/156.53 |
| 7,119,507 B2 * | 10/2006 | Nishijima | .............. | 318/400.41 |
| 7,385,328 B2 * | 6/2008 | Melfi | ..................... | 310/156.45 |
| 7,432,624 B2 * | 10/2008 | Kolehmainen et al. | . | 310/156.57 |
| 7,605,510 B2 * | 10/2009 | Okuma et al. | .......... | 310/156.53 |
| 2009/0152972 A1 * | 6/2009 | Nishijima | .............. | 310/156.57 |

FOREIGN PATENT DOCUMENTS

| | | |
|---|---|---|
| JP | 7-11859 A | 2/1995 |
| JP | 9-294344 A | 11/1997 |
| JP | 11-206051 A | 7/1999 |

(Continued)

*Primary Examiner*—Tran N Nguyen
(74) *Attorney, Agent, or Firm*—Birch, Stewart, Kolasch & Birch, LLP

(57) ABSTRACT

A field element core has field magnet through holes and connecting portions. The field magnet through holes are circumferentially arranged in a circumferential direction around a given direction, and are adjacent each other in the circumferential direction to form pairs. Seen from the given direction, field magnet through holes forming the same pair both extend along a certain one direction determined for each pair. A connecting portion is provided between the field magnet through holes of the same pair, and has the ends as its sides. The sides of the connecting portion are curved in a concave shape as a whole. Specifically, seen from the given direction, a tangent to the side is along the direction of extension of the connecting portion only at a certain one position between both ends of the side. The same holds true for the side.

19 Claims, 16 Drawing Sheets

FOREIGN PATENT DOCUMENTS

| | | |
|---|---|---|
| JP | 2001-161042 A | 6/2001 |
| JP | 2002-136008 A | 5/2002 |
| JP | 2002-281700 A | 9/2002 |
| JP | 2003-174747 A | 6/2003 |
| JP | 2003-309953 A | 10/2003 |
| JP | 2004-260888 A | 9/2004 |
| JP | 2005-102460 A | 4/2005 |

* cited by examiner

F I G. 1 8
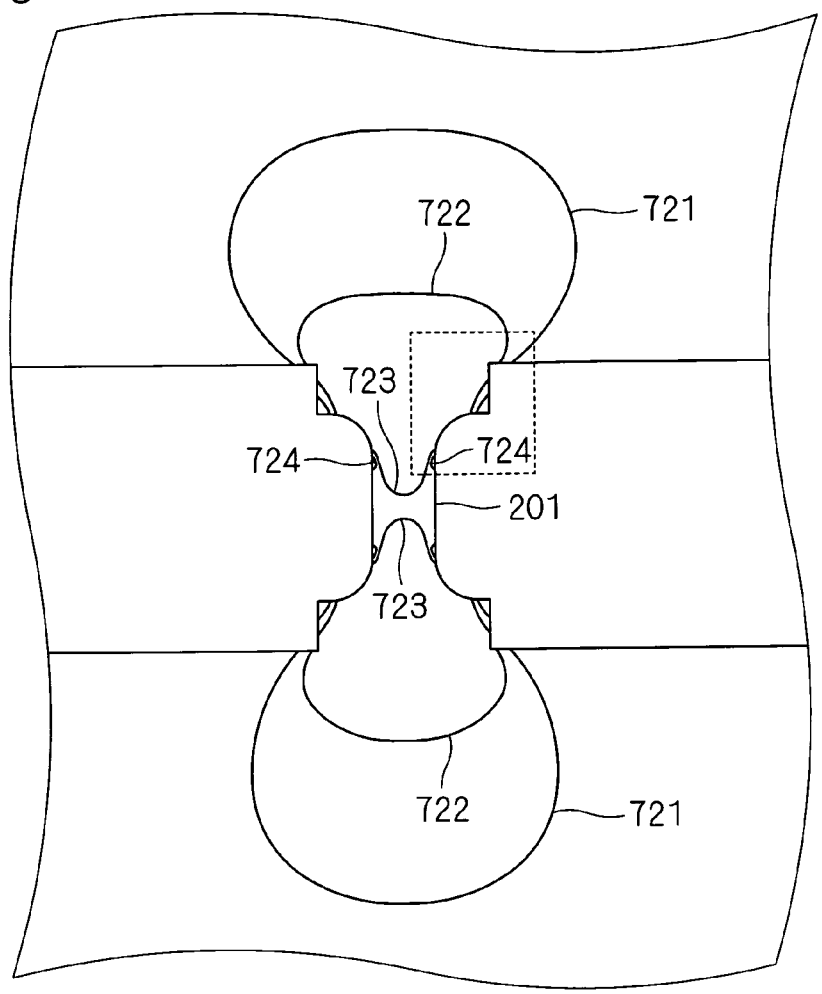
F I G. 1 9 A
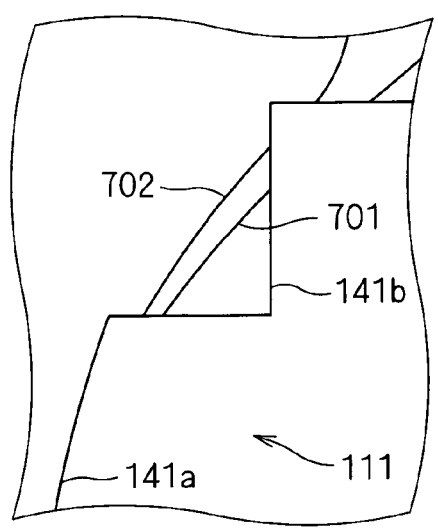
F I G. 1 9 B
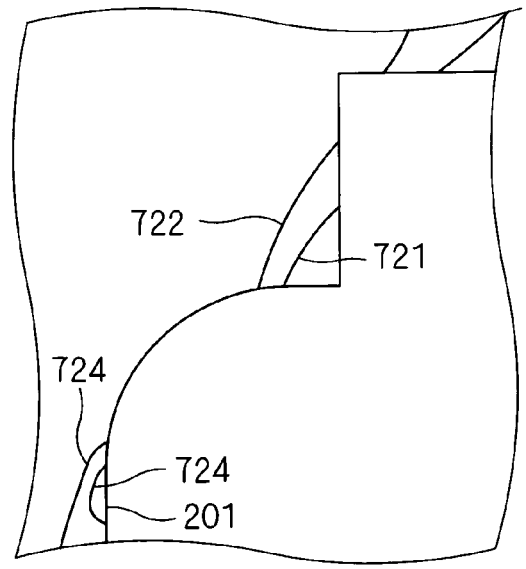

US 7,863,793 B2

FIELD ELEMENT CORE

TECHNICAL FIELD

The present invention relates to a core for a field element, and particularly to the configuration of the field element core.

BACKGROUND ART

Conventionally, techniques for enhancing the strength of field element cores have been proposed. For example, Patent Document 1 cited below discloses a technique in which a slot for insertion of a field magnet is divided into two, and a connecting portion (which is referred to as "a bridge" in Patent Document 1) which connects the outer side and the inner side of the field element core across the slots is provided.

However, the divided slots of Patent Document 1 are rectangular-shaped, and therefore have corners at the ends of the connecting portion. Accordingly, stresses occurring in the connecting portion concentrate in the corners, possibly causing deformation of the connecting portion or further of the field element core.

For example, Patent Document 2 and Patent Document 3 listed below introduce techniques for alleviating the stress concentration by rounding the corners of connecting portions.

Also, other techniques related to the present invention are introduced in Patent Documents 4 and 5.

Patent Document 1: Japanese Utility Model Application Laid-Open No. 7-11859 (1995)
Patent Document 2: Japanese Patent Application Laid-Open No. 2002-281700
Patent Document 3: Japanese Patent Application Laid-Open No. 2004-260888
Patent Document 4: Japanese Patent Application Laid-Open No. 9-294344 (1997)
Patent Document 5: Japanese Patent Application Laid-Open No. 2003-174747

DISCLOSURE OF THE INVENTION

Problems to be Solved by the Invention

However, Patent Document 2 and Patent Document 3 propose just rounding the corners, leaving other parts flat. Accordingly, stresses are still likely to concentrate in the vicinities of the rounded corners.

The present invention has been made by considering the above-described conditions, and an object of the present invention is to alleviate the stress concentration in connecting portions.

Means for Solving the Problems

According to a first aspect of the field element core of the present invention, a field element core comprises: field magnet through holes (41, 42) that are arranged annularly in a circumferential direction (92) around a given direction (91), said field magnet through holes being adjacent each other in said circumferential direction and forming a pair, each of said field magnet through holes having a pair of ends (411, 412, 421, 422) in said circumferential direction; and a connecting portion (11, 17, 18) provided between said field magnet through holes forming a same said pair, said connecting portion having, as sides (111, 112, 171, 172, 181, 182), said ends (412, 422) that belong to different said field magnet through holes and that are adjacent each other in said circumferential direction, wherein one (111, 171, 181) of said sides has at least one curved portion (111a, 121a, 131a, 141a, 151a, 161a, 171a, 181a, 181c) along a circle around a position (c111, c171, c1811, c1812) that is located, seen from said given direction, oppositely from said connecting portion with respect to said one of said sides, and a radius (Rb) of said circle satisfies a ratio (Rb/Lm, Rb/Ln, Rb/Ln1, Rb/Ln2) of not less than 1.0 nor more than 1.5 with respect to a length (Lm, Ln, Ln1, Ln2) of said at least one curved portion in a direction perpendicular to a first extension direction (941, 942) in which one of said field magnet through holes extends from said connecting portion, and a tangent (t (r)) to said at least one curved portion seen from said given direction is along a second extension direction (93) of extension of said connecting portion only at a certain one position (r13, r13, r33, r73, r76) between both ends of said at least one curved portion.

According to a second aspect of the field element core of the present invention, in the field element core of the first aspect, seen from said given direction (91), said field magnet through holes (41, 42) forming the same said pair all extend along a certain one direction (94) determined for each said pair.

According to a third aspect of the field element core of the present invention, in the field element core of the first or second aspect, said position (r13) is a middle point between positions of said both ends (r11, r12).

According to a fourth aspect of the field element core of the present invention, in the field element core of the first or second aspect, said position (r13) is shifted from a middle point between positions of said both ends (r11, r12) toward one of said both ends.

According to a fifth aspect of the field element core of the present invention, the field element core of the first or second aspect is rotatable around an axis of rotation along said given direction (91), and wherein, seen from said given direction (91), said second extension direction (93) is along a radius direction around said axis of rotation.

According to a sixth aspect of the field element core of the present invention, in the field element core of any of the first to fifth aspects, said both ends (r11, r12, r31, r32) of said at least one curved portion (111a, 171a) connect to surfaces (21, 31) of said one of said field magnet through holes (41, 42) respectively located on an outer periphery side and an inner periphery side with respect to said connecting portion (11, 17).

According to a seventh aspect of the field element core of the present invention, in the field element core of any of the first to sixth aspects, about said one of sides (111, 181) seen from said given direction (91), said one of sides further comprises a plane portion (121b, 151b, 161b, 181b) that extends along a direction (951, 952) perpendicular to said first extension direction (941, 942) in which said one of field magnet through holes (41, 42) extends from said connecting portion (11, 18), and one (r21, r23, r41, r51, r62, r71) of said ends of said at least one curved portion (121a, 161a; 181a) connects via said plane portion to said one of surfaces (21, 31) located on a same side as said one of said ends of said at least one curved portion with respect to said at least one curved portion.

According to an eighth aspect of the field element core of the present invention, in the field element core of the seventh aspect, said one (r51, r62) of said ends of said at least one curved portion (151a, 161a) connects directly to said plane portion (151b, 161b).

According to a ninth aspect of the field element core of the present invention, in the field element core of the seventh aspect, said plane portion (121b, 141b, 181b) seen from said given direction (91) protrudes from said at least one curved portion (121a, 141a, 181a) along said first extension direction (941, 942) in which said one of said field magnet through holes (41, 42) extends from said connecting portion (11, 18).

According to a tenth aspect of the field element core of the present invention, in the field element core of any of the seventh to ninth aspects, said at least one curved portion is a pair of curved portion and said one of said sides (181) has said pair (181a, 181c) of curved portions seen from said given direction (91), and said plane portion (181b) is provided between said pair of curved portions.

Effect of the Invention

According to any of the first to third aspects of the field element core of the present invention, the provision of the curved portion facilitates dispersion of stresses occurring in the connecting portion. This alleviates stress concentration in the connecting portion.

According to the fourth aspect of the field element core of the present invention, the tangent at the end of the curved portion that is located oppositely from the direction of shift from the middle point forms a larger angle with the direction in which the field magnet through hole extends from the connecting portion. This alleviates stress concentration at that end.

According to the fifth aspect of the field element core of the present invention, stresses occurring in the connection portion occur along the direction of extension of the connecting portion, which prevents deformation of the connecting portion.

According to the sixth aspect of the field element core of the present invention, the entirety of the side is curved so that stress concentration is not likely to occur in the connecting portion.

According to any of the seventh to ninth aspects of the field element core of the present invention, it is possible at the curved portion to disperse stresses occurring in the connecting portion. Furthermore, the formation of the curved portion on the side allows the plane portion to be provided without narrowing the area of the field magnet through hole seen from the given direction. When a magnet is inserted in the field magnet through hole, the magnet can be fixed on the plane portion.

According to the tenth aspect of the field element core of the present invention, it is possible at the first and second curved portions to disperse stresses occurring in the connecting portion. Furthermore, when a magnet is inserted in the field magnet through hole, the magnet can be fixed on the plane portion. Even when the end face of the magnet on the side of the connecting portion is curved in convex form, the plane portion can be provided in correspondence with the end face.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram illustrating stresses occurring in a connecting portion that is configured differently from the connecting portion 11.

FIG. 19A and FIG. 19B are diagrams showing the regions surrounded by the broken lines in FIGS. 16 and 18 in an enlarged manner.

BEST MODE FOR CARRYING OUT THE INVENTION

Figure 1:
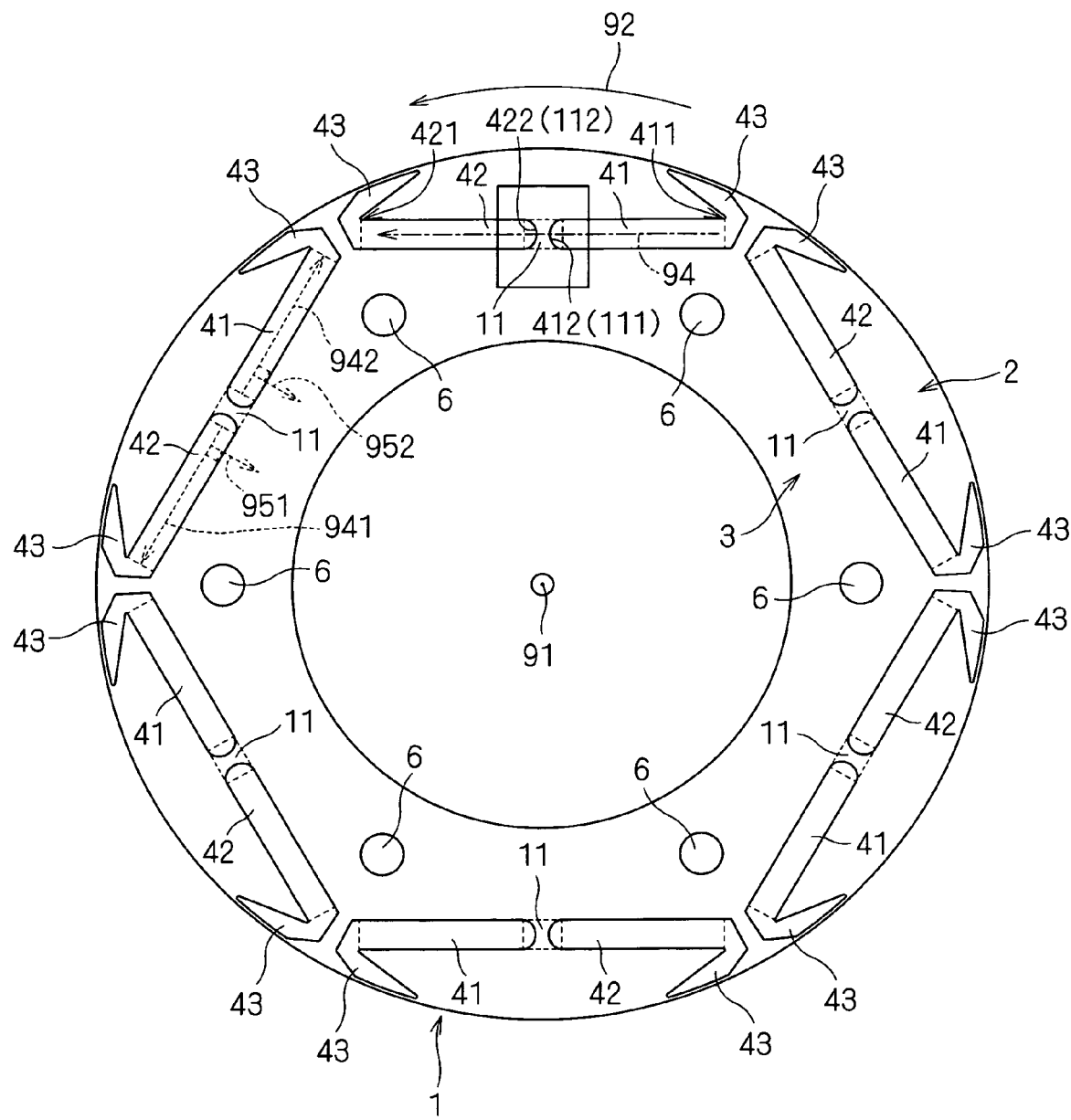
FIG. 1 is a top view conceptually illustrating a field element core 1 according to the present invention.

FIG. 1 is a top view conceptually illustrating a field element core 1 according to the present invention. The field element core 1 has field magnet through holes 41, 42 and connecting portions 11 (or connecting portions 17 and 18 respectively in the third and fourth preferred embodiments described later).

The field magnet through holes 41 and 42 are annularly arranged in a circumferential direction 92 around a given direction 91, and they are placed adjacent in the circumferential direction 92 to form pairs. FIG. 1 shows a structure in which the field magnet through holes 41 and 42 of each same pair both extend along a certain one direction 94 that is determined for each pair, seen from the given direction 91. However, seen from the given direction 91, one of the field magnet through holes 41 and 42 of the same pair may be inclined with respect to the other. More specifically, an extension direction 942 in which the field magnet through hole 41 extends, and a direction 941 in which the field magnet through hole 42 extends, may intersect with each other. The preferred embodiments described later will explain structures in which both of the field magnet through holes 41 and 42 extend along one direction 94.

Each field magnet through hole 41 has a pair of ends 411 and 412 along the circumferential direction 92, and each field magnet through hole 42 has a pair of ends 421 and 422 along the circumferential direction 92.

A connecting portion 11 is provided between the field magnet through holes 41 and 42 of the same pair, and has the ends 412 and 422 as its sides 111 and 112. This content can be regarded as: the ends 412 and 422 that belong to different field magnet through holes 41 and 42 respectively and that are adjacent each other in the circumferential direction 92 respectively constitute the sides 111 and 112 of the connecting portion 11.

Now, the shapes of the sides 111 and 112 of the connecting portion 11 will be described. In FIG. 1, with the field element core 1, the core portion on the outer periphery side is referred to by the symbol 2, and the core portion on the inner periphery side is referred to by the symbol 3, with respect to the field magnet through holes 41 and 42 and the connecting portions 11.

FIRST PREFERRED EMBODIMENT

Figure 2:
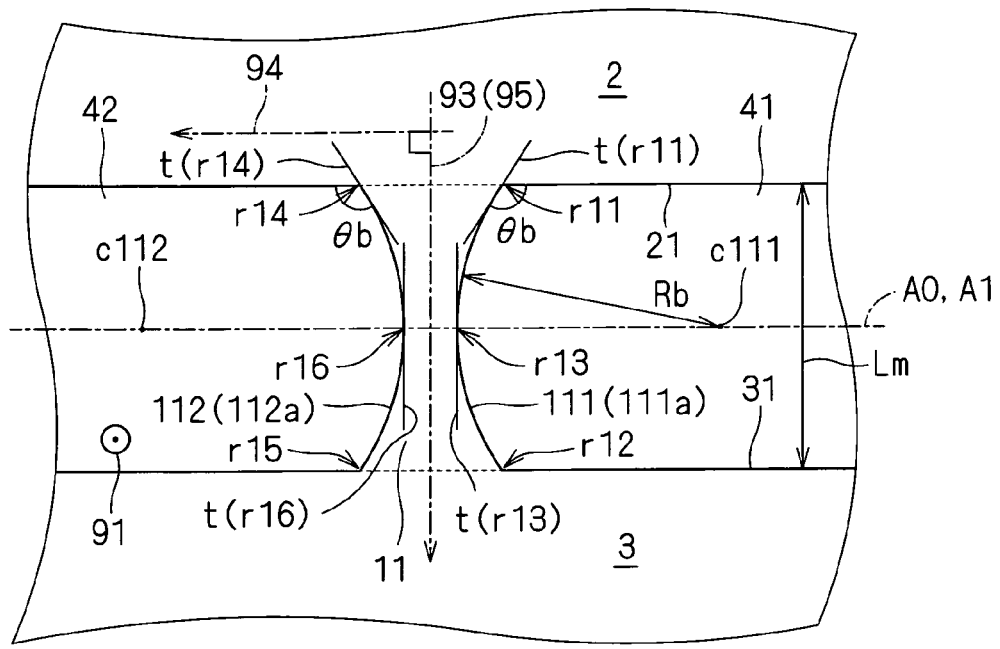
FIG. 2 is a diagram conceptually illustrating a connecting portion 11 that is described in a first preferred embodiment.
Figure 3:
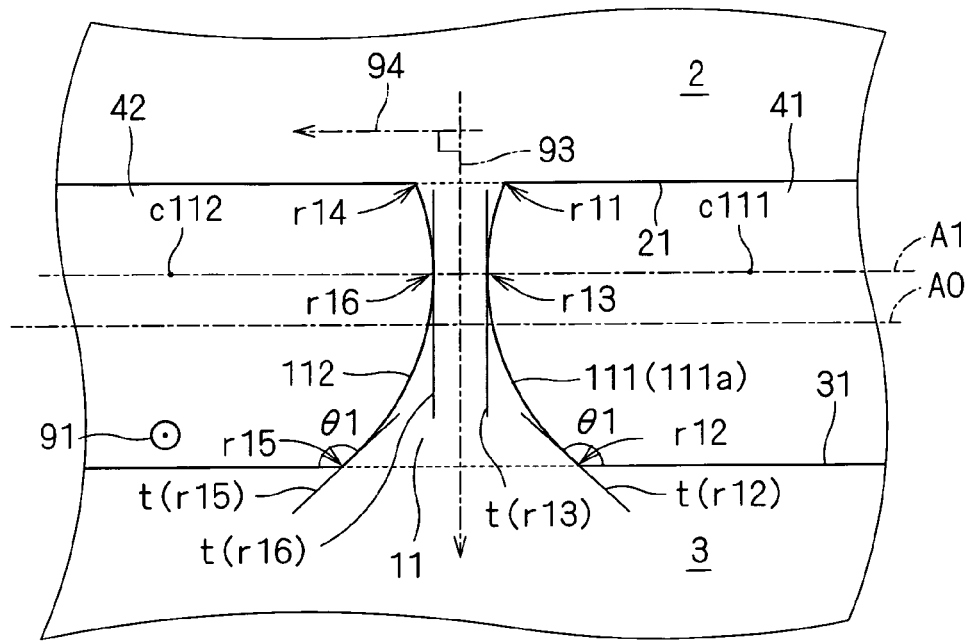
FIG. 3 is a diagram conceptually illustrating a connecting portion 11 that is described in the first preferred embodiment.

FIGS. 2 and 3 each show one connecting portion 11 shown in FIG. 1 in an enlarged manner. The sides 111 and 112 of the connecting portion 11 are curved in a concave shape as a whole. Specifically, seen from the given direction 91, a tangent t (r13) to the side 111 is along a direction 93, in which the connecting portion 11 extends, only at a certain one position r13 between both ends of the side 111. The extension direction 93 is a direction from the outer periphery side of the field element core 1 toward the inner periphery side, and it is perpendicular to the one direction 94 in this preferred embodiment.

Similarly, the side 112 is also curved in a concave shape, and a tangent t (r16) is along the extension direction 93 only at a certain one position r16 between both ends r14 and r15 thereof.

According to the above-described shape of the sides 111 and 112, the sides 111 and 112 are curved as a whole, and therefore stresses occurring in the connecting portion 11 are distributed, preventing stress concentration in the connecting portion 11.

When the entireties of the sides 111 and 112 are regarded as curved portions 111a and 112a, then the above-described shape of the sides 111 and 112 can be regarded as follows. That is, seen from the given direction 91, both ends of the curved portion 111a connect respectively to the surface 21 on the core portion 2 side, and to the surface 31 on the core portion 3 side of the field magnet through hole 41. The same applies to the curved portion 112a.

From the aspect of dispersion of stresses, it is desired that the straight line A1 including the position r13 and the position r16 be along the one direction 94.

In particular, FIG. 2 shows a structure in which, seen from the given direction 91, the center line A0 of the field magnet through holes 41 and 42 along the one direction 94 coincides with the straight line A1. That is, the position r13 is at the middle point between the positions of both ends r11 and r12 of the side 111. Also, the position r16 is at the middle point between the positions of both ends r14 and r15 of the side 112.

FIG. 3 shows a structure in which the straight line A1 is shifted from the center line A0 toward the core portion 2. That is, the position r13 is shifted toward the core portion 2, i.e. toward the position r11, from the middle point between the positions of both ends r11 and r12 of the side 111. Also, the position r16 is shifted toward the core portion 2, i.e. toward the position r14, from the middle point between the positions of both ends r14 and r15 of the side 112.

According to this configuration, on the side opposite from the direction in which the positions r13 and r16 are shifted from the middle point (which can be regarded as the side opposite from the direction in which the straight line A1 is shifted from the center line A0), that is, at the end r12 of the side 111 on the core portion 3 side in FIG. 3, the tangent t (r12) to the side 111 and the surface 31 of the field magnet through hole 41 form a larger angle θ1 on the field magnet through hole 41 side, which alleviates the stress concentration at the end r12. Similarly, at the end r15 of the side 112, the tangent t (r15) to the side 112 and the surface 31 of the field magnet through hole 42 form a larger angle θ1 on the field magnet through hole 42 side, alleviating the stress concentration at the end r15.

The straight line A1 may be shifted from the center line A0 toward the core portion 3, for example. That is, the positions r13 and r16 may be shifted from the middle points toward the core portion 3.

In any of the configurations described above, from the aspect of stress dispersion, it is more desired that, seen from the given direction 91, the sides 111 and 112 be respectively along circles around positions c111 and c112 located on the straight line A1 on the sides opposite to the connecting portion 11 with respect to the sides 111 and 112. FIGS. 2 and 3 show such configurations.

Figure 4:
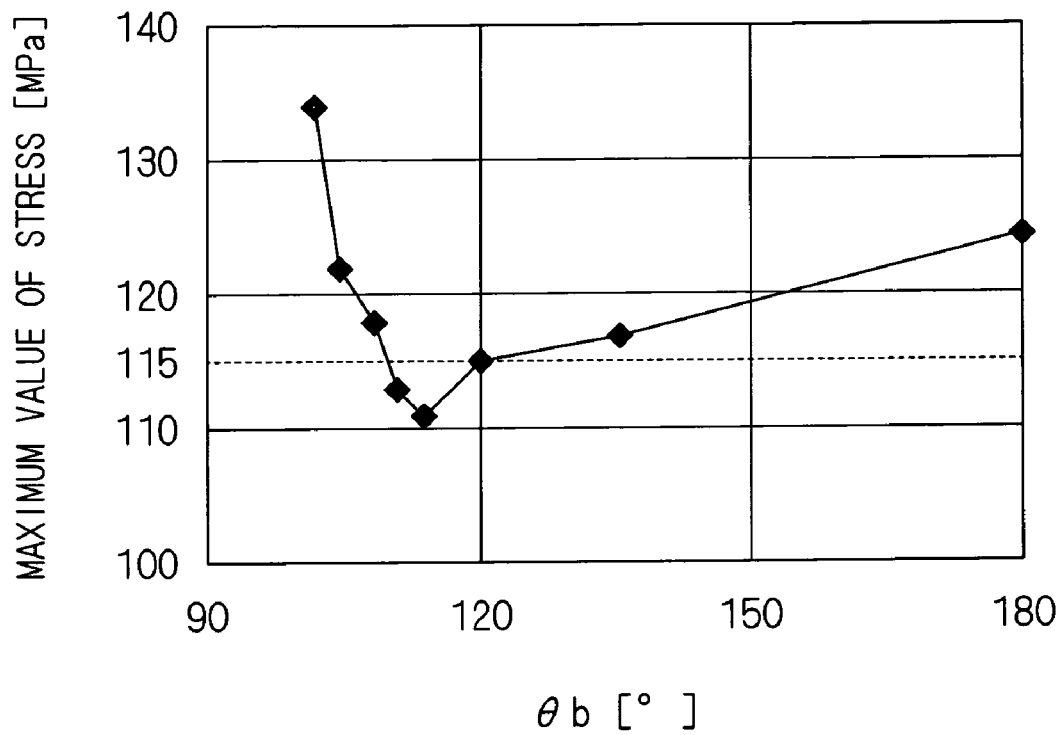
FIG. 4 is a diagram illustrating a relation between an angle θb and the maximum value of stress occurring in a connecting portion 11.

For the configuration of the connecting portion 11 shown in FIG. 2, FIG. 4 is a graph showing a relation between the angle θb that the tangent t (r11) and the surface 21 form on the field magnet through hole 41 side and the maximum value of stress occurring in the connecting portion 11. The angle that the tangent t (r14) and the surface 21 form on the field magnet through hole 42 side is the same as the angle θb.

The angle θb is given by Expression (1) with a ratio Rb/Lm of the radius Rb of the circles along which the sides 111 and 112 extend, with respect to a width Lm. The width Lm is the length of the field magnet through holes 41 and 42 in a direction 95 that is perpendicular to the one direction 94. The one direction 94 can be regarded as a direction in which the field magnet through holes 41 and 42 extend from the connecting portion 11, which holds also in the description below.

[Expression 1]

$$\theta b = 90° + \mathrm{Sin}^{-1}\left(\frac{Lm}{2 \cdot Rb}\right) \quad (1)$$

The graph shown in FIG. 4 shows the result obtained by a simulation under the conditions below. That is, the outer diameter of the field element core 1 is 88.6 (mm), the number of rotations is 120 (/min), the distance Lb between the position r13 and the position r16 is 0.6 (mm), the width Lm is 2.8

Figure 5:
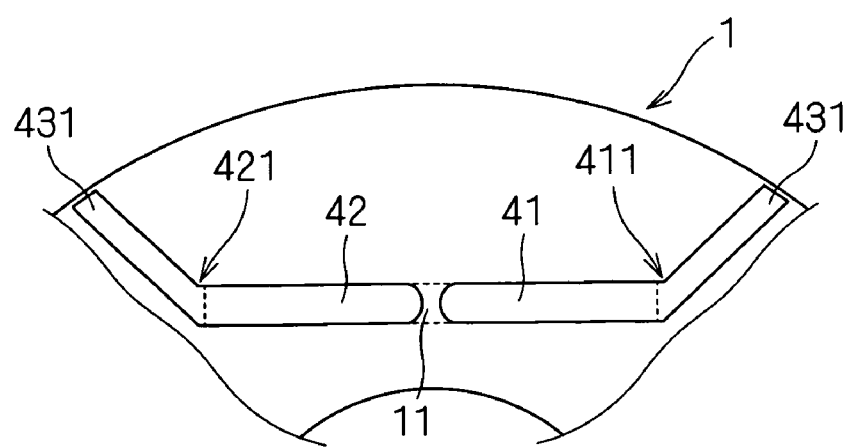
FIG. 5 is a diagram illustrating gaps 431 formed with field magnet through holes 41 and 42.

(mm), and the radius Rb is 1.4 to 6.7 (mm), i.e. the angle θb is 100 to 180 (°). Also, as shown in FIG. 5, gaps 431 are formed respectively at the ends 411 and 421 of the field magnet through holes 41 and 42. The gaps 431 extend from the ends 411 and 421 toward the outer periphery side of the field element core 1. In this simulation, the ends r11, r12, r14, r15 were rounded with a radius of 0.2 (mm).

It is seen from the graph shown in FIG. 4 that the maximum value of stress is not more than 120 (Mpa) when the angle θb is in the range of 106.1 to 135.6 (°), i.e. when the ratio Rb/Lm is in the range of 0.7 to 1.8. Also, it is seen that the maximum value of stress is not more than 115 (MPa) when the angle θb is in the range of 109.5 to 120 (°), i.e. when the ratio Rb/Lm is in the range of 1.0 to 1.5.

Figure 6:
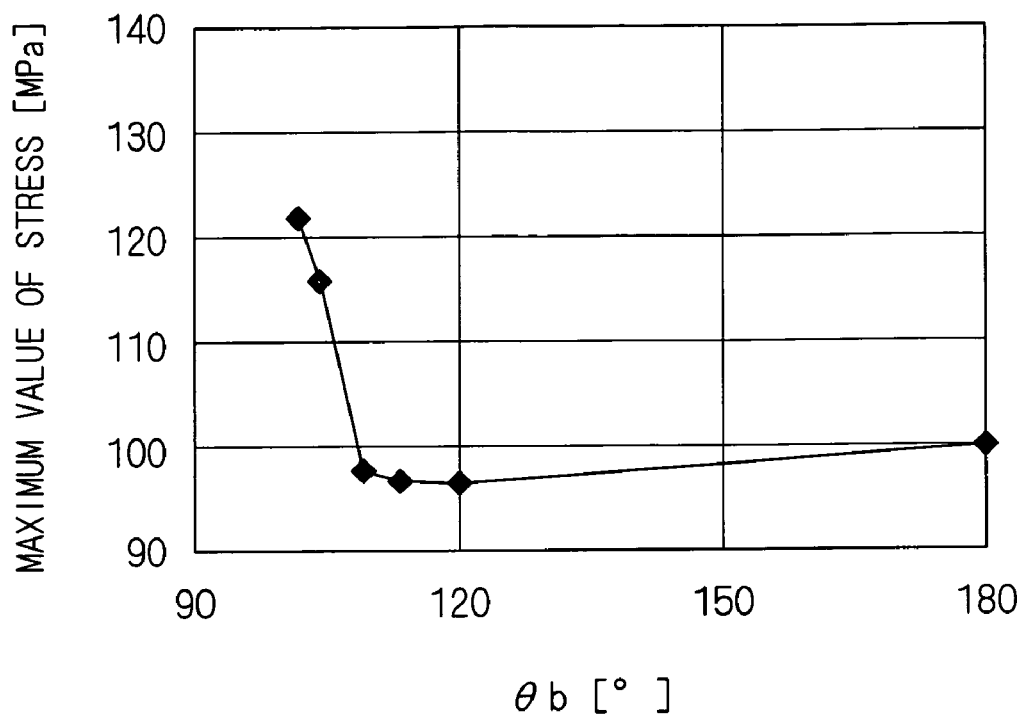
FIG. 6 is a diagram illustrating a relation between the angle θb and the maximum value of stress occurring in a connecting portion 11.
Figure 7:
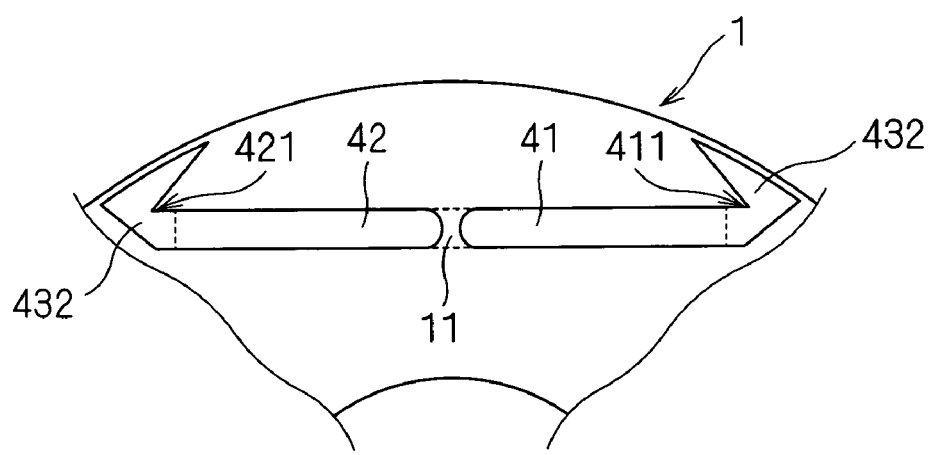
FIG. 7 is a diagram illustrating gaps 432 formed with the field magnet through holes 41 and 42.

FIG. 6 shows the results of a simulation obtained under conditions different from those for the graph shown in FIG. 4. The conditions are as follows. The outer diameter of the field element core 1 is 123 (mm), the number of rotations is 120 (/min), the distance Lb is 0.7 (mm), the width Lm is 5.2 (mm), and the radius Rb is 2.6 to 10.4 (mm), i.e. the angle θb is 104 to 180 (°). Also, as shown in FIG. 7, gaps 432 are formed respectively at the ends 411 and 421 of the field magnet through holes 41 and 42. The gaps 432 extend from the ends 411 and 421 between the field element core 1 and the outer periphery of the field element core 1. In this simulation, the ends r11, r12, r14, r15 were rounded with a radius of 0.2 (mm).

It is seen from the graph shown in FIG. 6 that the maximum value of stress is not more than 100 (MPa) when the angle θb is in the range of 110 to 180 (°).

Figure 8:
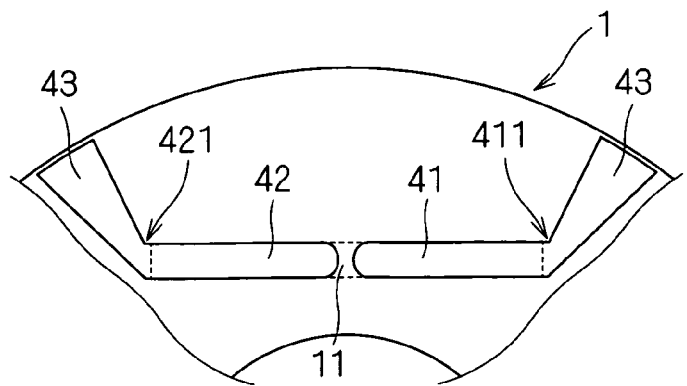
FIG. 8 is a diagram illustrating gaps 43 formed with the field magnet through holes 41 and 42.
Figure 9:
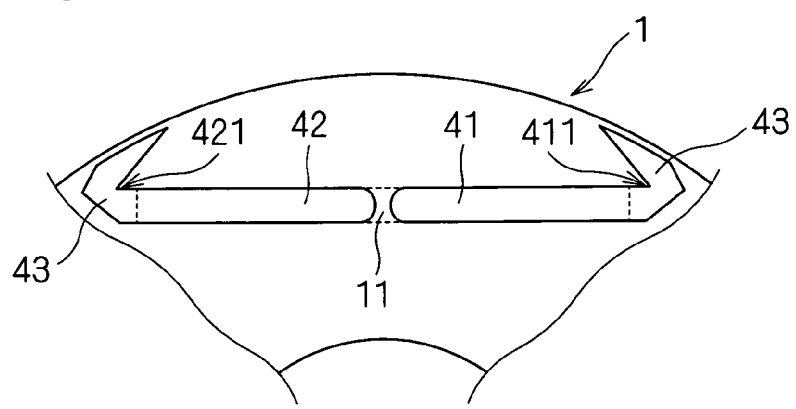
FIG. 9 is a diagram illustrating gaps 43 formed with the field magnet through holes 41 and 42.
Figure 10:
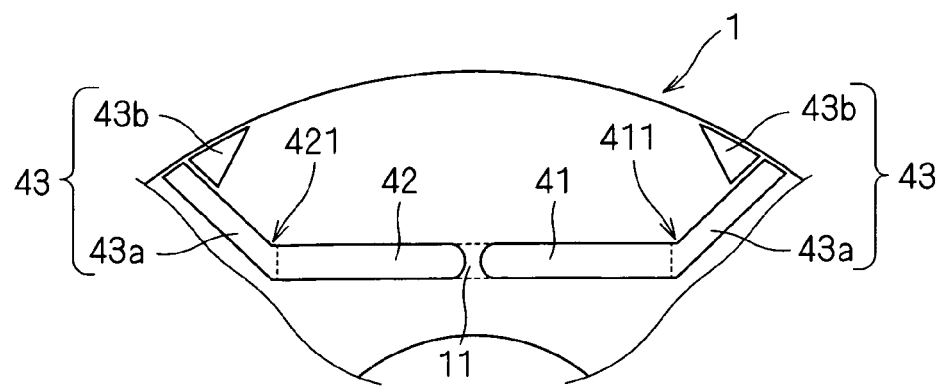
FIG. 10 is a diagram illustrating gaps 43 formed with the field magnet through holes 41 and 42.

With the ends 411 and 421, gaps 43 shaped as shown in FIGS. 8 to 10 may be provided, for example. In FIG. 8, the gaps 43 extend from the ends 411 and 421 toward the outer periphery of the field element core 1, and expand toward the outer periphery. In FIG. 9, the gaps 43 extend from the ends 411 and 421 between the field magnet through holes 41, 42 and the outer periphery, and the distances between the gaps 43 and the outer periphery are narrowed toward the ends of the gaps 43. In FIG. 10, the gaps 43 have portions 43a that extend from the ends 411 and 421 toward the outer periphery, and portions 43b that are separated from the portions 43a and extend between the field magnet through holes 41, 42 and the outer periphery.

SECOND PREFERRED EMBODIMENT

FIGS. 11 to 15 show structures in which the sides 111 and 112 of the connecting portion 11 shown in FIG. 2 have flat areas (hereinafter referred to as "plane portions") 121b, 131b, 141b, 151b, 161b, 122b, 132b, 142b, 152b, 162b that are along the direction 95 perpendicular to the one direction 94. In these cases, as well as the plane portions 121b, 131b, 141b, 151b and 161b, the sides 111 and 112 further have curved portions 121a, 131a, 141a, 151a, 161a, 122a, 132a, 142a, 152a, 162a. As described in the first preferred embodiment, when the one direction 94 is regarded as the direction in which the field magnet through holes 41 and 42 extend from the connecting portion 11, then the plane portions 121b, 131b, 141b, 151b, 161b, 122b, 132b, 142b, 152b, 162b can be regarded as being along a direction that is perpendicular to that direction.

Figure 11:
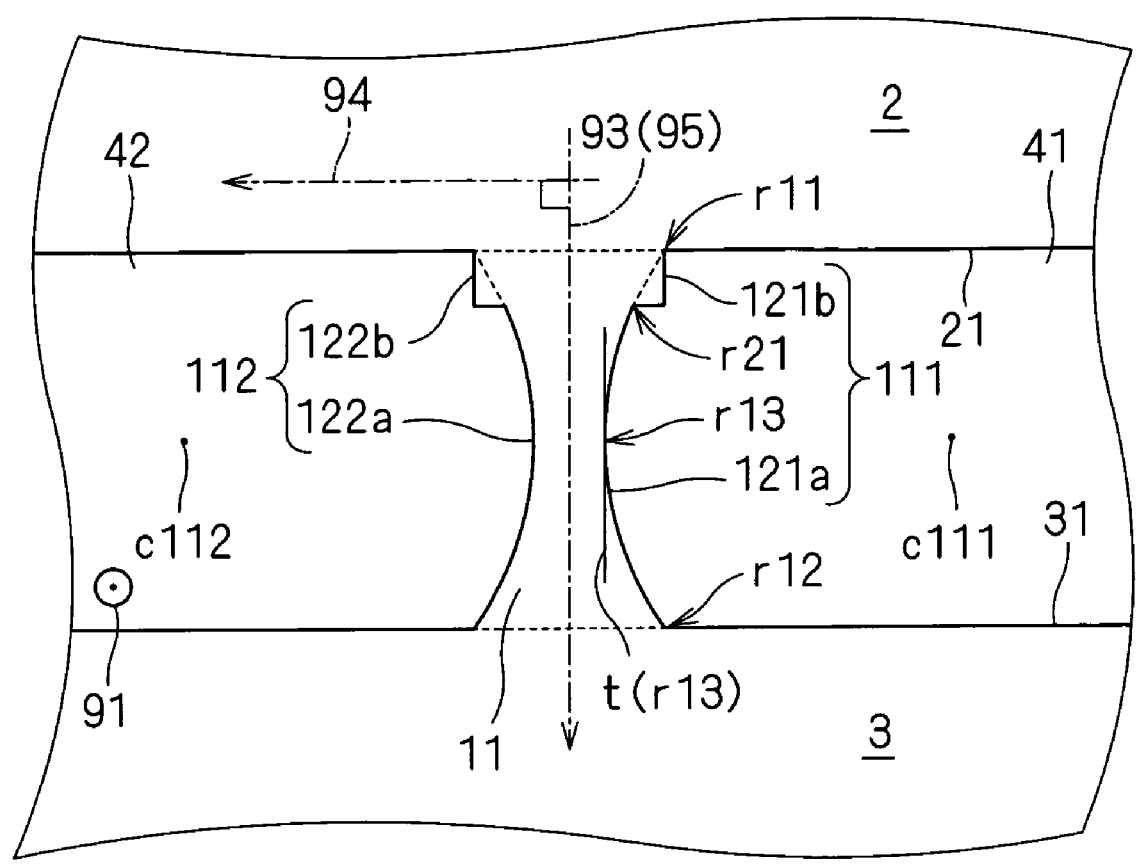
FIG. 11 is a diagram conceptually illustrating a connecting portion 11 that is described in a second preferred embodiment.

In FIG. 11, the plane portions 121b and 122b are formed respectively at the ends of the sides 111 and 112 on the core portion 2 side. The plane portion 121b protrudes from the curved portion 121a along the one direction 94. The plane portion 122b protrudes from the curved portion 122a along the one direction 94.

The plane portions 121b and 122b may be formed respectively at the ends of the sides 111 and 112 on the core portion 3 side.

Figure 12:
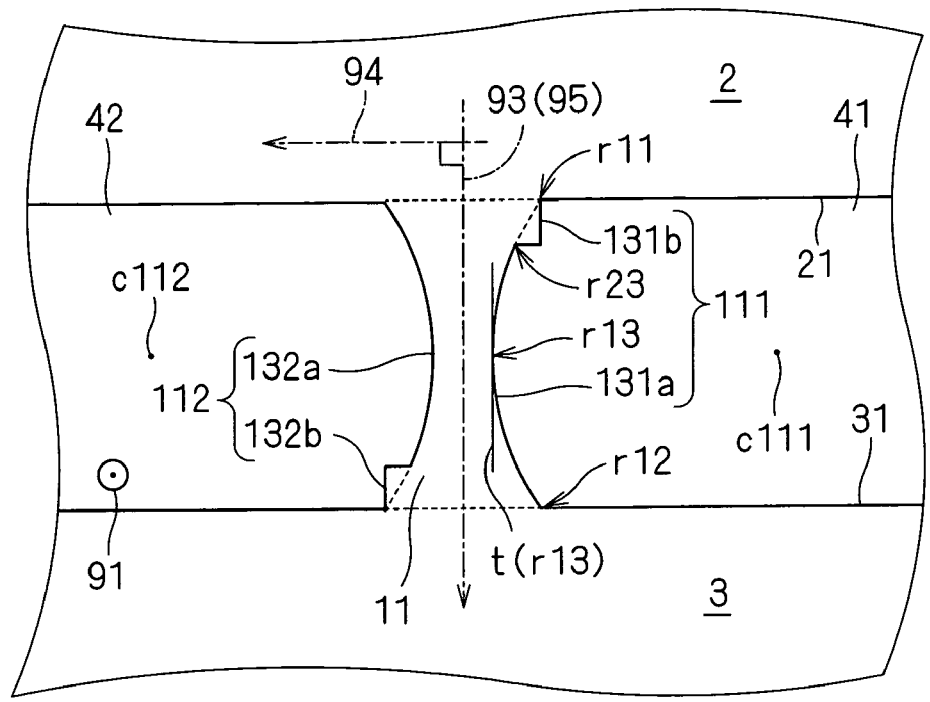
FIG. 12 is a diagram conceptually illustrating a connecting portion 11 that is described in the second preferred embodiment.

In FIG. 12, the plane portion 131b is formed at the end of the side 111 on the core portion 2 side, and the plane portion 132b is formed at the end of the side 112 on the core portion 3 side. The plane portion 131b protrudes from the curved portion 131a along the one direction 94. The plane portion 132b protrudes from the curved portion 132a along the one direction 94.

Figure 13:
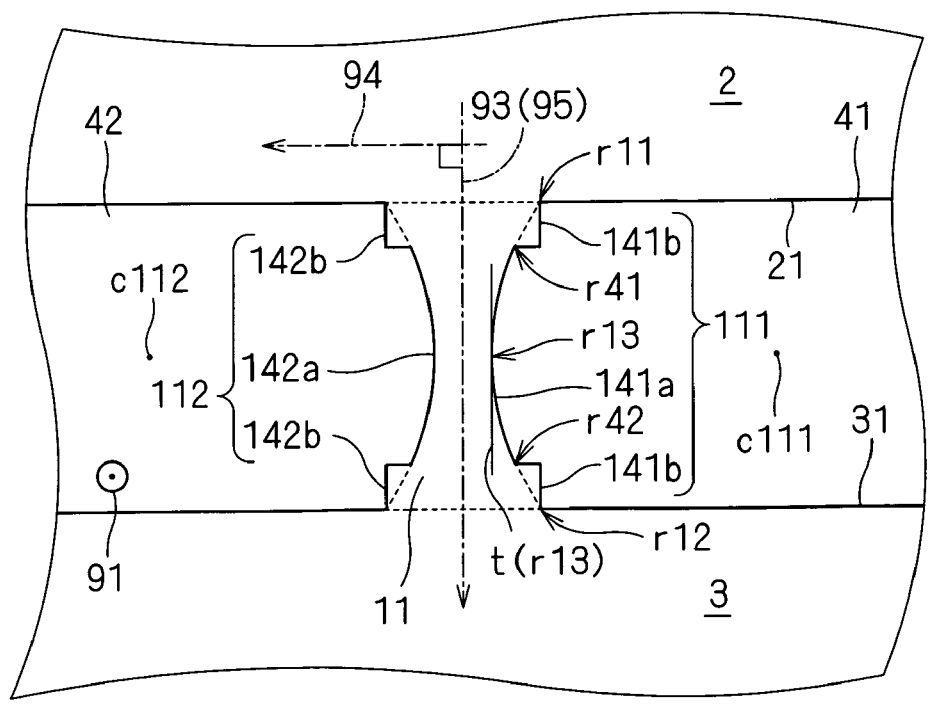
FIG. 13 is a diagram conceptually illustrating a connecting portion 11 that is described in the second preferred embodiment.

In FIG. 13, the plane portions 141b are formed at both ends of the side 111, and the plane portions 142b are formed at both ends of the side 112. The plane portions 141b protrude from the curved portion 141a along the one direction 94. The plane portions 142b protrude from the curved portion 142a along the one direction 94.

Figure 14:
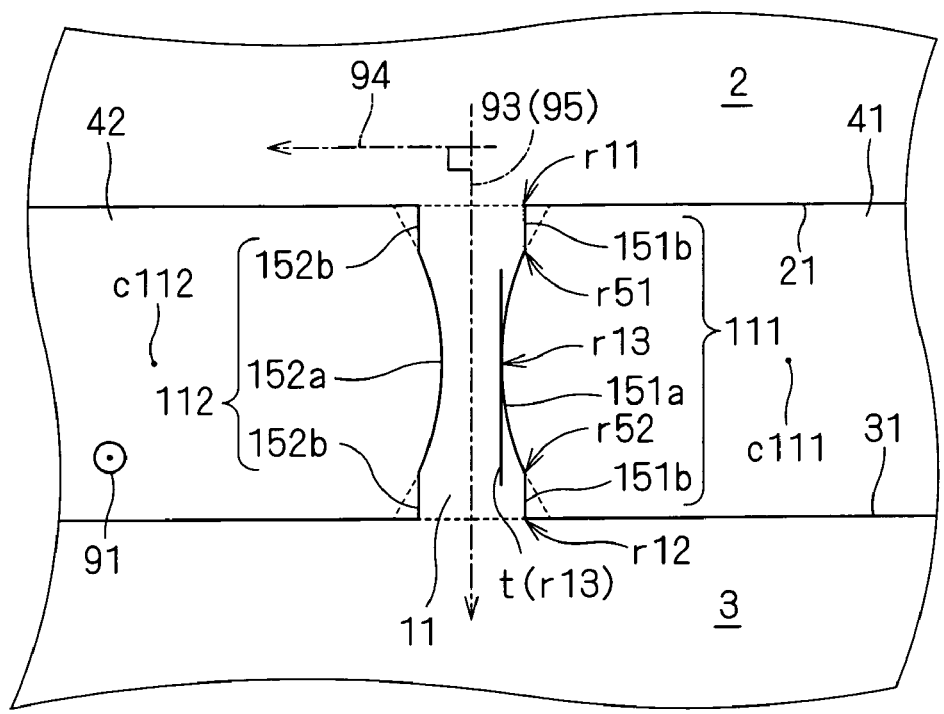
FIG. 14 is a diagram conceptually illustrating a connecting portion 11 that is described in the second preferred embodiment.

In FIG. 14, the plane portions 151b are formed at both ends of the side 111, and the plane portions 152b are formed at both ends of the side 112. The curved portion 151a connects directly to the plane portions 151b. The curved portion 152a connects directly to the plane portions 152b.

Figure 15:
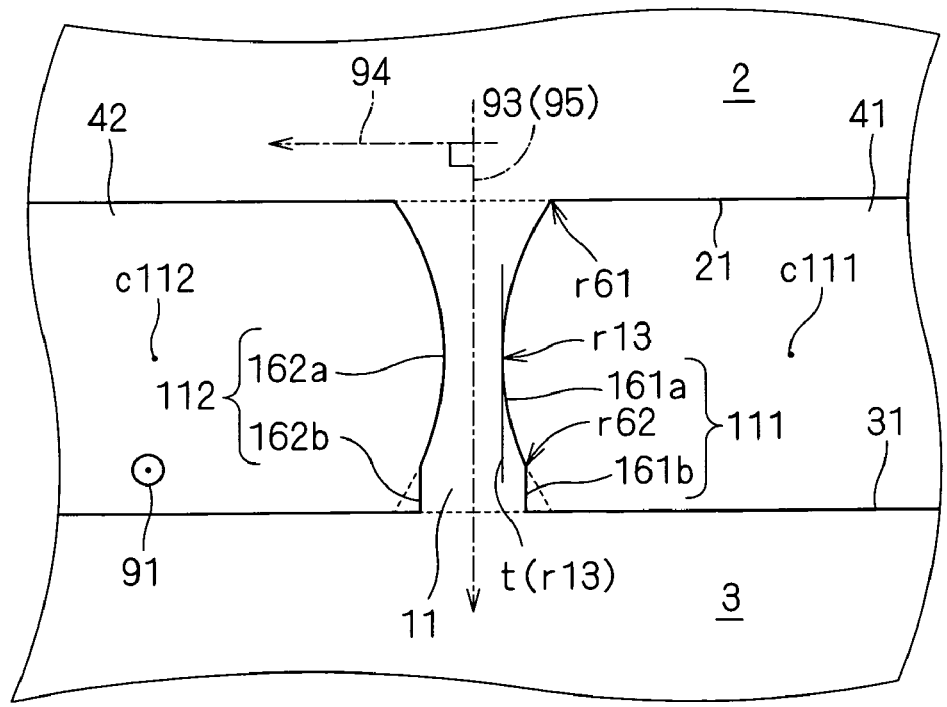
FIG. 15 is a diagram conceptually illustrating a connecting portion 11 that is described in the second preferred embodiment.

In FIG. 15, the plane portions 161b and 162b are formed respectively at the ends of the sides 111 and 112 on the core portion 3 side. The curved portions 161a and 162a directly connect respectively to the plane portions 161b and 162b.

The plane portions 161b and 162b may be formed respectively at the ends of the sides 111 and 112 on the core portion 2 side.

The configurations of the side 111 can be regarded as follows. That is, seen from the given direction 91, at least one r21, r23, r41, r42, r51, r52, r62 of the ends of the curved portion 121a, 131a, 141a, 151a, 161a connects via the plane portion 121b, 131b, 141b, 151b, 161b to the surface 21, 31 of the field magnet through hole 41 that is located on the same side as that end with respect to that curved portion 121a, 131a, 141a, 151a, 161a. The same holds true for the side 112.

According to the above-described configurations of the sides 111 and 112, it is possible, at the curved portions 121a, 131a, 141a, 151a, 161a, 122a, 132a, 142a, 152a, 162a, to distribute stresses occurring in the connecting portion 11. Furthermore, forming the curved portions 121a, 131a, 141a, 151a, 161a, 122a, 132a, 142a, 152a, 162a on the sides 111 and 112 allows the formation of the plane portions 121b, 131b, 141b, 151b, 161b, 122b, 132b, 142b, 152b, 162b without narrowing the areas of the field magnet through holes seen from the given direction 91. Also, when magnets are inserted in the field magnet through holes 41 and 42, the magnets can be fixed at the plane portions.

The first preferred embodiment obtained the results by simulations that setting the ratio Rb/Lm in the range of 1.0 to 1.5 reduces the maximum value of stress. The width Lm can be regarded as a length Ln of the curved portion of the side 111 in the perpendicular direction 95. Accordingly, it is expected that the same results will be obtained also when the width Lm adopts the length Ln of the curved portions 121a, 131a, 141a, 151a, 161a, 122a, 132a, 142a, 152a, 162a in the perpendicular direction.

Figure 16:
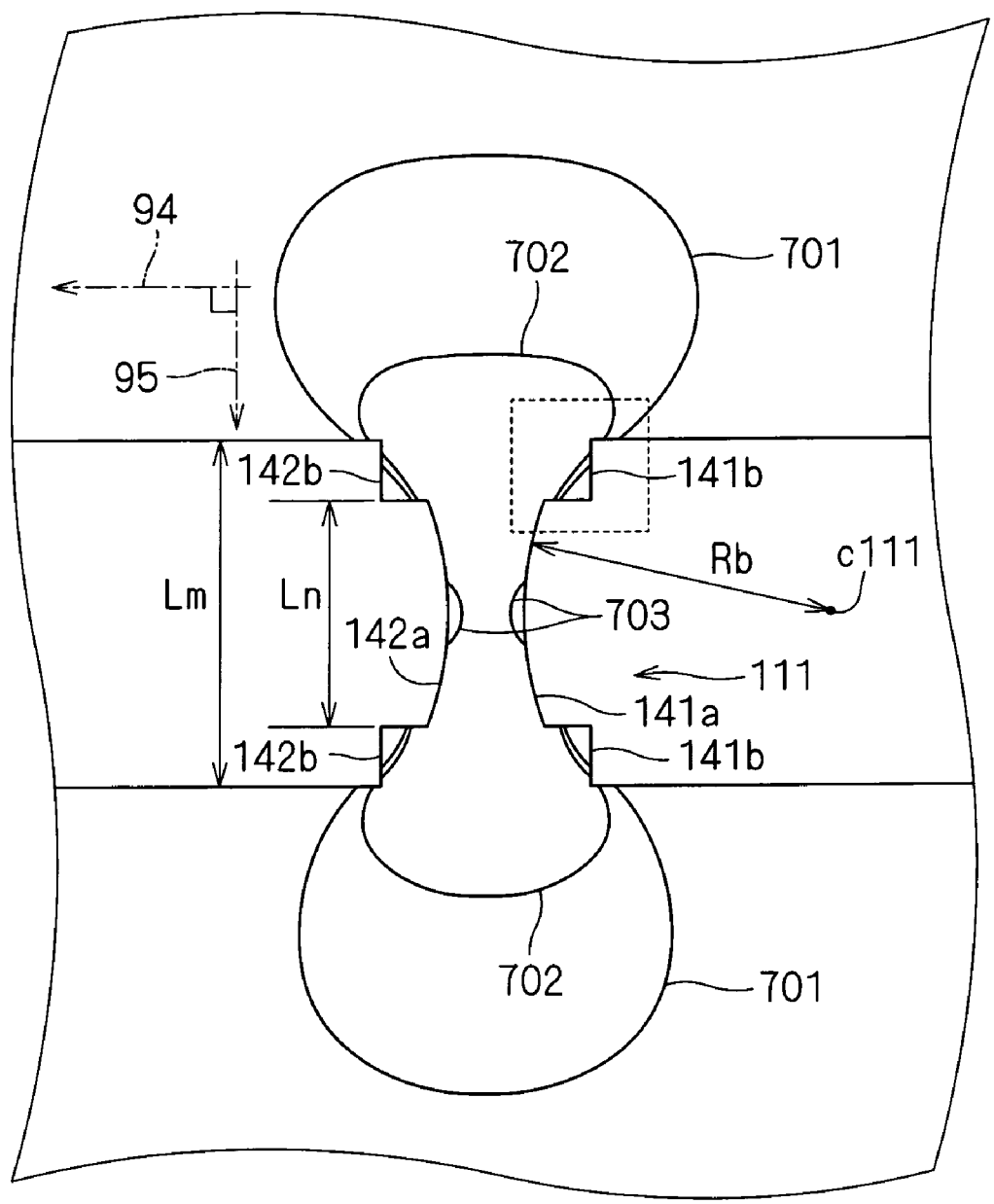
FIG. 16 is a diagram illustrating, with contour lines, stresses occurring in the connecting portion 11 shown in FIG. 13.

FIG. 16 shows the results obtained by a simulation about stresses occurring in the connecting portion 11 shown in FIG. 13, with contour lines 701 to 703. The contour lines 701 to 703 indicate larger stresses in this order.

The conditions for the simulation are: the outer diameter of the field element core 1 is 90 (mm), the number of rotations is 120 (/min), the distance Lb between the position r13 and position r16 is 0.6 (mm), the width Lm is 2.8 (mm), the length Ln is 1.8 (mm), the radius Rb is 2.3 (mm), and the ratio Ln/Rb is 0.78.

It is seen from FIG. 16 that the stress is maximum in the centers of the curved portions 141a and 142a in the direction 95 perpendicular to the one direction 94. The stress in these portions was about 120 (MPa).

Figure 17:
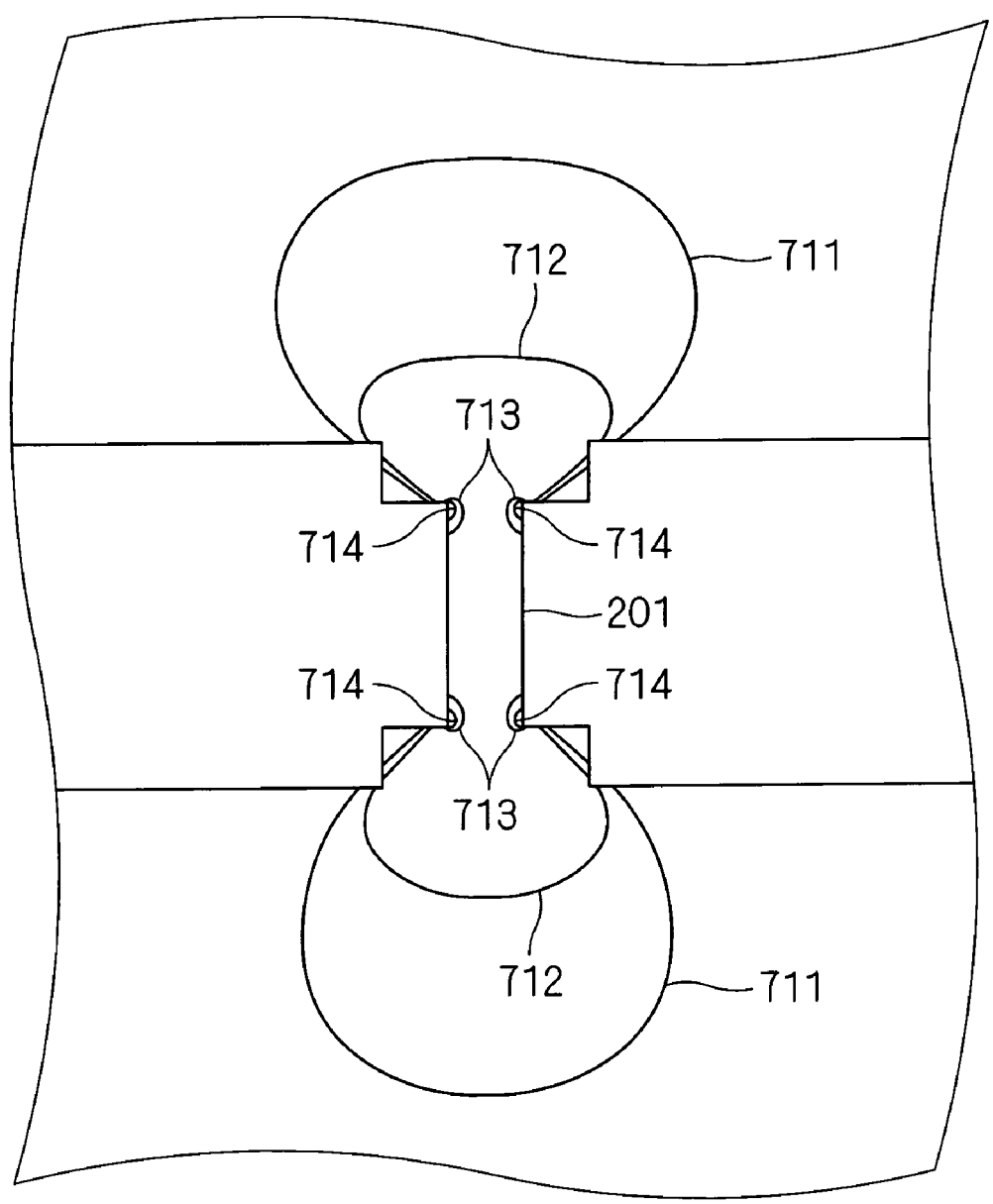
FIG. 17 is a diagram illustrating stresses occurring in a connecting portion that is configured differently from the connecting portion 11.

For comparison with the results shown in FIG. 16, FIGS. 17 and 18 show the results obtained by simulations about connecting portions configured differently from that shown in FIG. 13. FIG. 17 shows the results about a connecting portion where the curved portions of the connecting portion 111 are made flat (these portions are referred to as "flat portions 201" here), with stress contour lines 711 to 714. The contour lines 711 to 714 indicate larger stresses in this order. In this connecting portion, the thickness of the flat portions 201 in the one direction 94 is 0.6 (mm), and the other conditions are the same as those of FIG. 16. FIG. 18 shows the results about a connecting portion in which both ends of the flat portions 201 of the connecting portion shown in FIG. 17 are rounded with a radius of 0.5 (mm), with contour lines 721 to 724. The contour lines 721 to 724 indicate larger stresses in this order. The other conditions are the same as those of FIG. 16.

It is seen from FIG. 17 that stresses concentrate at both ends of the flat portions 201. The stress in these portions was about 139 (MPa). It is seen from FIG. 18 that stresses concentrate in the vicinities of the connections between the rounded portions and the flat portions 201. The stress in these portions was about 130 (MPa).

From the results above, it is seen that the formation of the curved portion 141a on the side 111 alleviates the stress concentration in the connecting portion 11 even when the plane portions 141b and 142b are formed at both ends thereof. Furthermore, the distance between the position r13 and the position r16 is reduced, and the short of magnetic flux is prevented.

FIG. 19A and FIG. 19B respectively show, in an enlarged manner, the areas surrounded by the broken lines in FIGS. 16 and 18. It is seen from FIG. 19A that the stress is small at the corner of the plane portion 141b on the curved portion 141a side. Furthermore, the area of the region of small stress (the region surrounded by the contour line 701 and the side 111) is larger than the area of the region surrounded by the contour line 721 and the side shown in FIG. 19B. That is, it is seen that stresses are not likely to concentrate in the corners when the flat portions 201 shown in FIG. 18 are curved like the curved portions 141a and 142a (FIG. 16).

THIRD PREFERRED EMBODIMENT

Figure 20:
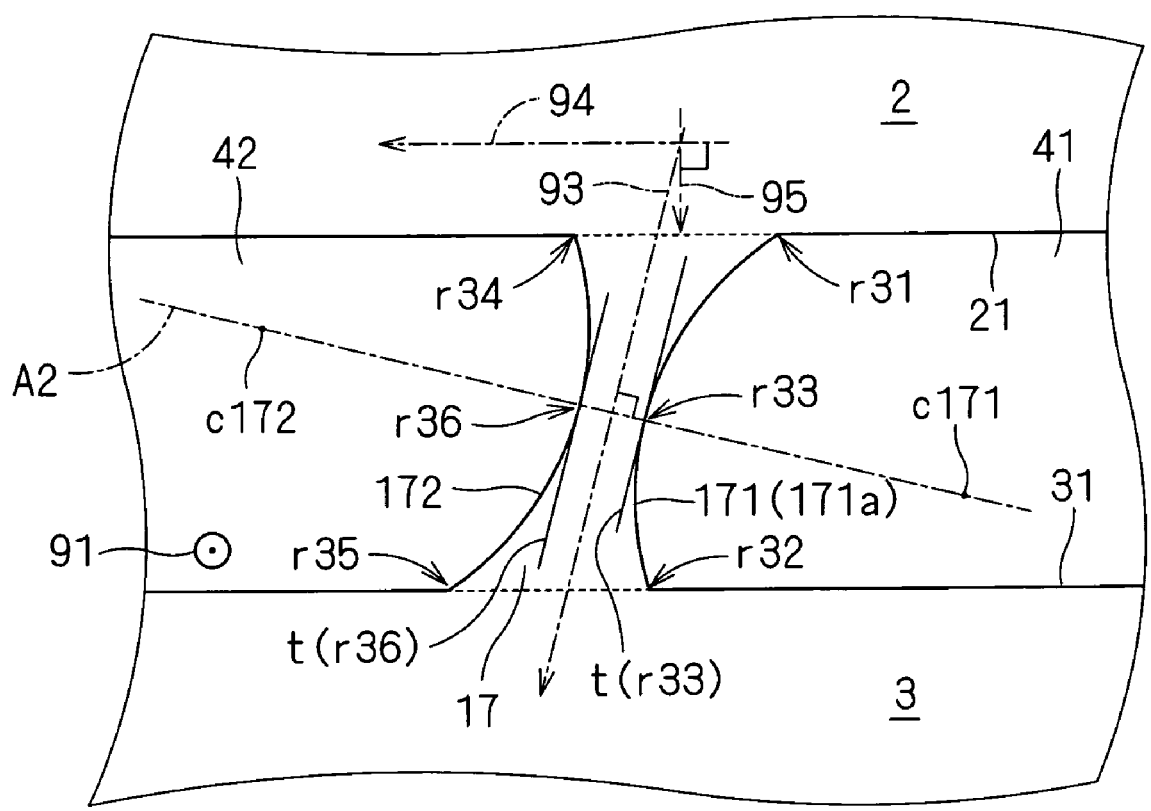
FIG. 20 is a diagram conceptually illustrating a connecting portion 17 that is described in a third preferred embodiment.

FIG. 20 shows the connecting portion 11, shown in FIG. 2, when the extension direction 93 thereof is inclined, seen from the given direction 91, with respect to the direction 95 that is perpendicular to the one direction 94, as a connecting portion 17. The sides of the connecting portion 17 are referred to by reference numerals 171 and 172. When the extension directions 941 and 942 (FIG. 1) of the field magnet through holes 41 and 42 intersect with each other, for example, the connecting portion 17 is inclined with respect to the direction that equally divides, into two, the angle, that the extension direction 941 and the extension direction 942 form on the inner periphery side of the field element core 1.

Specifically, when the connecting portion 17 is provided in a position where the radius direction around the axis of rotation of the field element core 1 is inclined with respect to the direction 95 that is perpendicular to the one direction 94, the extension direction 93 of the connecting portion 17 is along that radius direction.

For the side 171, seen from the given direction 91, a tangent t (r33) to the side 171 is along the direction 93 of extension of the connecting portion 17 only at a certain one position r33 between both ends r31 and r32 of the side 171. Similarly, for the side 172, a tangent t (r36) to the side 172 is along the extension direction 93 only at a certain one position r36 between both ends r34 and r35 of the side 172.

This configuration prevents deformation of the connecting portion 17. This is because, when the field element core 1 is rotated around the axis of rotation that is along the given direction 91, stresses occur in the field element core 1 in the radius direction around the axis of rotation, but the direction 93 in which the connecting portion 17 extends is along the direction in which the stresses occur, and so the stress components are small in the direction perpendicular to the extension direction 93.

It is desired, from the aspect of stress dispersion, that the straight line A2 including the position r33 and the position r36 intersect at right angles with the direction 93 of extension of the connecting portion 17. Also, it is more desired that, seen from the given direction 91, the sides 171 and 172 be respectively along circles, the center of which is positions c171 and c172 located on the straight line A2 on the sides opposite to the connecting portion 17 with respected to the sides 171 and 172.

Plane portions as described in the second preferred embodiment may be provided in the connecting portion 17 according to this preferred embodiment.

FOURTH PREFERRED EMBODIMENT

Figure 21:
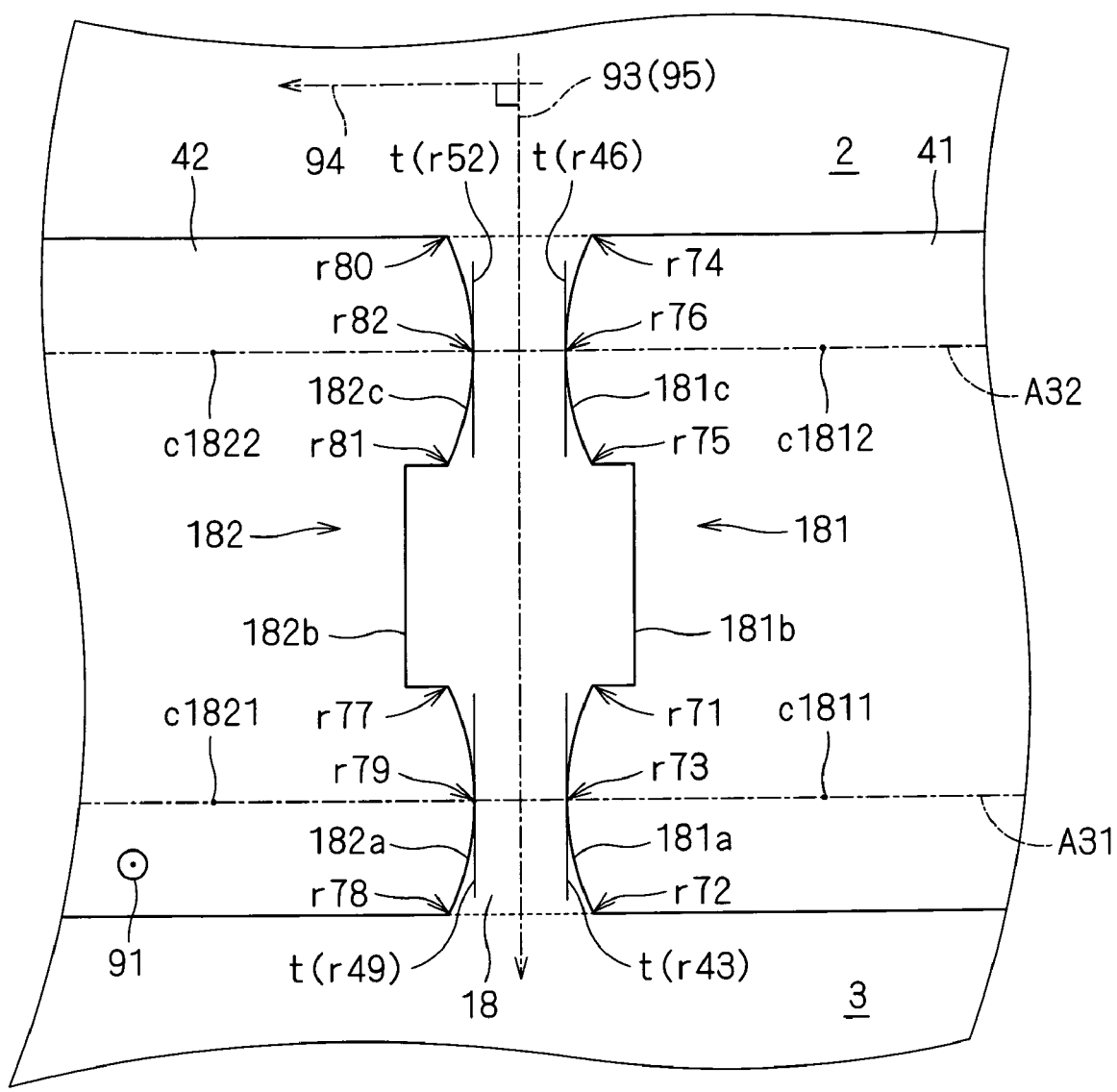
FIG. 21 is a diagram conceptually illustrating a connecting portion 18 that is described in a fourth preferred embodiment.

FIG. 21 conceptually illustrates a connecting portion 18 according to this preferred embodiment. The sides of the connecting portion 18 are referred to by symbol 181 and 182. In this preferred embodiment, the direction 93 in which the connecting portion 18 extends is perpendicular to the one direction 94.

The side 181 has curved portions 181a and 181c and a plane portion 181b. Seen from the given direction 91, the curved portion 181a is curved in a concave shape, and a tangent t (r43) is along the extension direction 93 only at a certain one position r73 between both ends r71 and r72 of the curved portion 181a.

Similarly to the curved portion 181a, the curved portion 181c is also curved in a concave shape, and a tangent t (r46) is along the extension direction 93 only at a certain one position r76 between both its ends r74 and r75.

The plane portion 181b is flat along the direction 95 perpendicular to the one direction 94, and is located between the curved portion 181a and the curved portion 181c. As described in the first preferred embodiment, when the one direction 94 is regarded as a direction in which the field magnet through holes 41 and 42 extend from the connecting portion 18, then the plane portion 181b can be regarded as being along the direction perpendicular to that direction.

The plane portion 181b may protrude with respect to the curved portions 181a and 181c along the one direction 94, or the ends r71 and r75 of the curved portions 181a and 181c may connect directly to the plane portion 181b. FIG. 21 shows the former configuration.

The side 182 has curved portions 182a and 182c and a plane portion 182b. Seen from the given direction, the curved portion 182a is curved in a concave shape, and a tangent t (r49) is along the extension direction 93 only at a certain one position r79 between both ends r77 and r78 of the curved portion 182a.

Similarly, the curved portion 182*c* is also curved in a concave shape, and a tangent t (r52) is along the extension direction 93 only at a certain one position r82 between both ends r80 and r81 thereof.

The plane portion 182*b* is flat along the direction 95 perpendicular to the one direction 94, and is located between the curved portion 182*a* and the curved portion 182*c*. The plane portion 182*b* can be regarded in the same way as the plane portion 181*b*.

The plane portion 182*b* may protrude with respect to the curved portions 182*a* and 182*c* along the one direction 94, or the ends r77 and r81 of the curved portions 182*a* and 182*c* may directly connect to the plane portion 182*b*. FIG. 21 shows the former configuration.

According to the above-described configuration of the side 181, it is possible to distribute stresses occurring in the connecting portion 18 at the curved portions 181*a* and 181*c*. Furthermore, when a magnet is inserted in the field magnet through hole 41, the magnet can be fixed on the plane portion 181*b*. Then, even when the end faces of the magnets toward the connecting portion 18 are curved in convex shape, the plane portions 181*b* and 182*b* can be formed in correspondence with the end faces. Similarly, the side 182 can distribute stresses and fix the magnet inserted in the field magnet through hole 42.

From the aspect of stress dispersion, it is desired that the straight line A31 including the position r73 and the position r79 perpendicularly intersect with the extension direction 93. Also, from the same aspect, it is desired that the straight line A32 including the position r76 and the position r82 also perpendicularly intersect with the extension direction 93. Also, it is desired that the length for which the plane portions 181*b* and 182*b* protrude respectively from the curved portions 181*a* and 182*a* be not more than ⅓ with respect to the width Lm.

Also, it is more desired that, seen from the given direction 91, the curved portions 181*a* and 182*a* be respectively along circles around positions c1811 and c1821 located on the straight line A31 on the sides opposite from the connecting portion 18 with respect to the curved portions 181*a* and 182*a*. Also, it is more desired that, seen from the given direction 91, the curved portions 181*c* and 182*c* be also along circles around positions c1812 and c1822 located on the straight line A32 on the sides opposite from the connecting portion 18 seen from the curved portions 181*c* and 182*c*.

When the radiuses of the circles around the positions c1811 and c1821, and the radiuses of the circles around the positions c1812 and c1822, are equal to each other (hereinafter referred to as "radius Rb"), the same estimate can be made as in the third preferred embodiment, from the results of simulations described in the first preferred embodiment. That is, the maximum value of stress is reduced when the ratio Rb/Ln1 of the radius Rb with respect to the length Ln1 of the curved portions 181*a* and 182*a* in the direction 95 perpendicular to the one direction 94, is set in the range of 1.0 to 1.5, and the ratio Rb/Ln2 of the radius Rb with respect to the length Ln2 of the curved portions 181*c* and 182*c* in the direction 95 is set in the range of 1.0 to 1.5.

Figure 22:
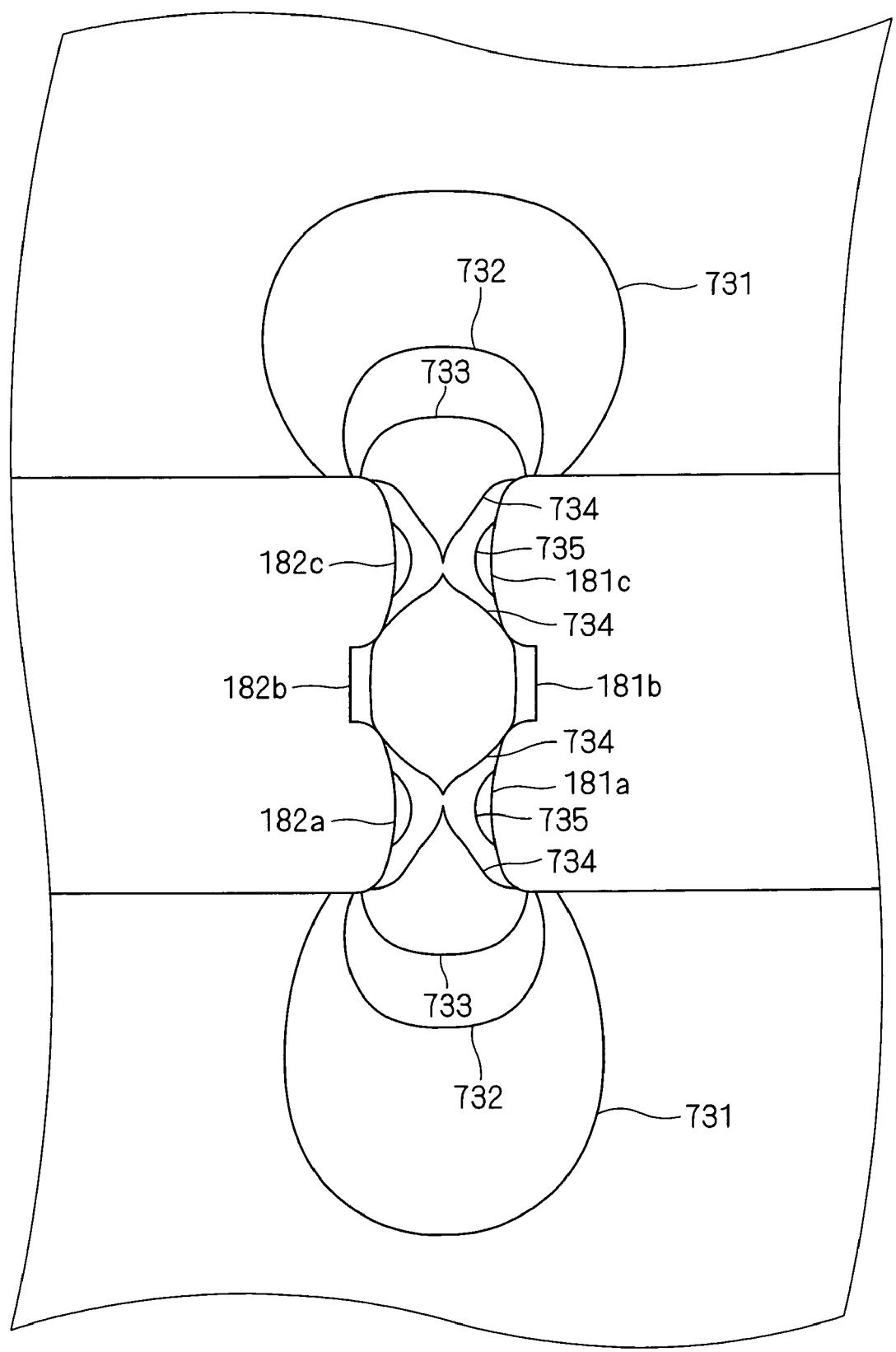
FIG. 22 is a diagram illustrating stresses occurring in the connecting portion 18 with contour lines.

FIG. 22 shows the results obtained by a simulation about stresses occurring in the connecting portion 18 shown in FIG. 21, with contour lines 731 to 735. The contour lines 731 to 735 indicate larger stresses in this order.

The conditions for the simulation are: the outer diameter of the field element core 1 is 88.6 (mm), the number of rotations is 120 (/min), the distance Lb1 between the position r73 and the position r79 is 0.6 (mm), the distance Lb2 between the position r76 and the position r82 is 0.6 (mm), the width Lm is 2.8 (mm), the lengths Ln1 and Ln2 are 1.15 (mm), the radius Rb is 1.4 (mm), and the ratios Rb/Ln1, Rb/Ln2 are 1.22. Both ends of the curved portions 181*a*, 181*c*, 182*a* and 182*c* were rounded with a radius of 0.2 (mm).

It is seen from FIG. 22 that stress is maximum in the center areas of the curved portions 181*a*, 181*c*, 182*a* and 182*c* in the direction 95 perpendicular to the one direction 94. The stress in these portions was about 123 (MPa).

Figure 23:
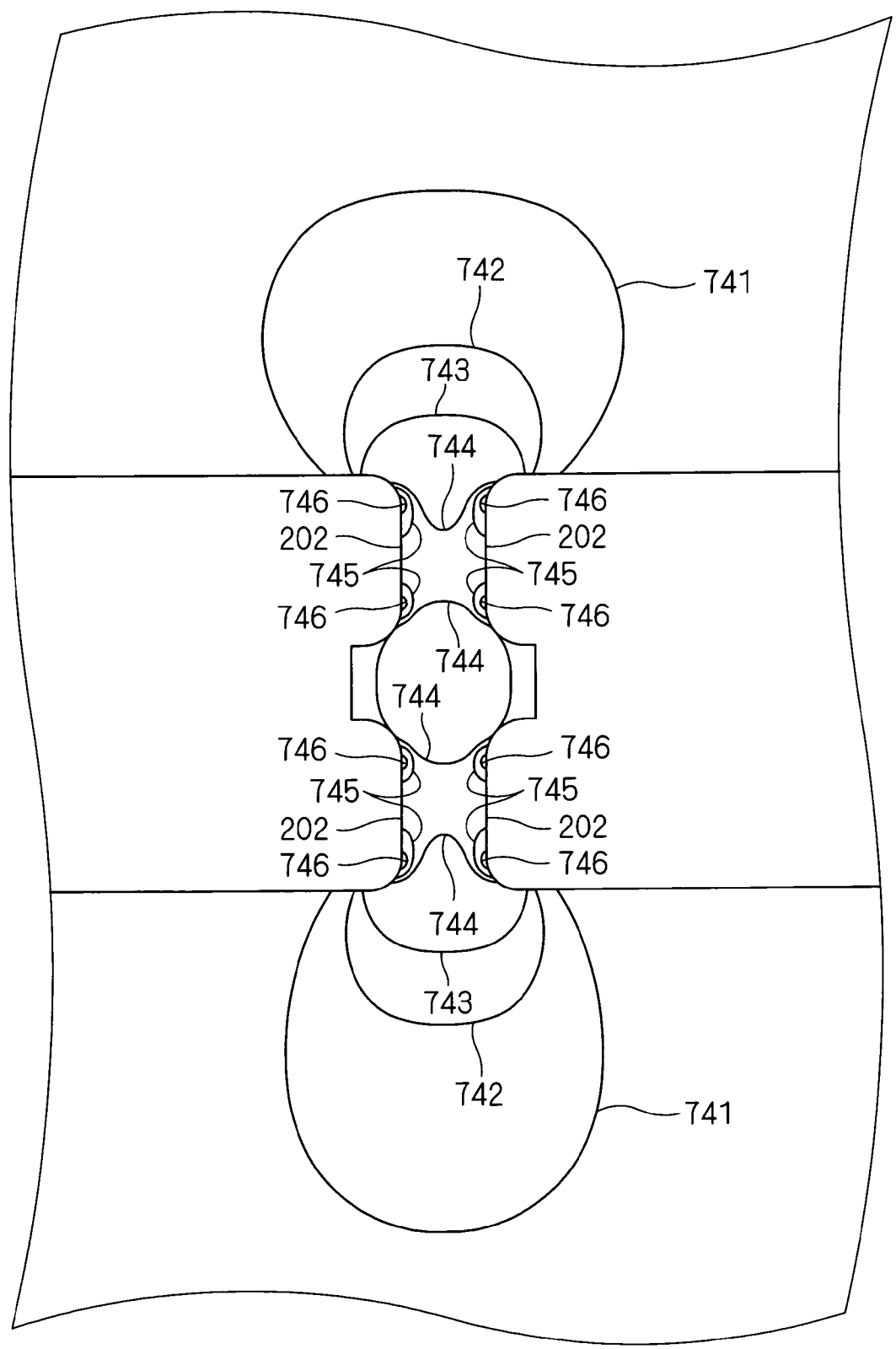
FIG. 23 is a diagram illustrating stresses occurring in a connecting portion that is configured differently from the connecting portion 18.

For comparison with the results shown in FIG. 22, FIG. 23 shows, with contour lines 741 to 746, the results obtained by a simulation about a connecting portion configured differently from that shown in FIG. 21. The contour lines 741 to 746 indicate larger stresses in this order. In the connecting portion, the curved portions 181*a*, 181*c*, 182*a* and 182*c* are all made flat (these portions are referred to as "flat portions 202"), and both ends of the flat portions 202 are rounded with a radius of 0.3 (mm).

It is seen from FIG. 23 that stresses concentrate in both ends of the flat portions 202. The stress in these portions is about 140 (MPa).

It is seen from the results above that forming the curved portions 181*a*, 181*c*, 182*a*, 182*c* on the sides 181 and 182 alleviate stress concentration as compared with the connecting portion (FIG. 23) in which these portions are flat.

In any of the preferred embodiments described so far, when the extension directions 942 and 941 of the field magnet through holes 41 and 42 intersect, "the direction 95 perpendicular to the one direction 94" for the sides 111 and 181 of the field magnet through holes 41 is replaced by "a direction 951 (FIG. 1) perpendicular to the extension direction 942", and "the direction 95 perpendicular to the one direction 94" for the sides 112, 182 of the field magnet through holes 42 is replaced by "a direction 952 (FIG. 1) perpendicular to the extension direction 941".

MODIFICATIONS

All of the preferred embodiments described so far are applicable also to three or more field magnet through holes that are disposed adjacent in the circumferential direction 92 to form a set. That is, one of the connecting portions 11, 17 and 18 is adopted between adjacent field magnet through holes belonging to the same set.

For example, the field element core 1 can be obtained by laminating magnetic steel sheets in the given direction 91 and caulking the magnetic steel sheets together.

Figure 24:
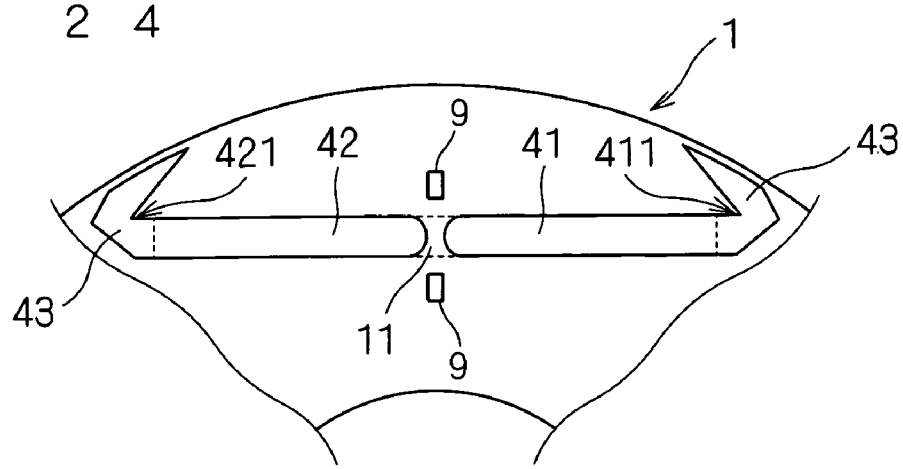
FIG. 24 is a diagram conceptually illustrating the positions of caulking 9.
Figure 25:
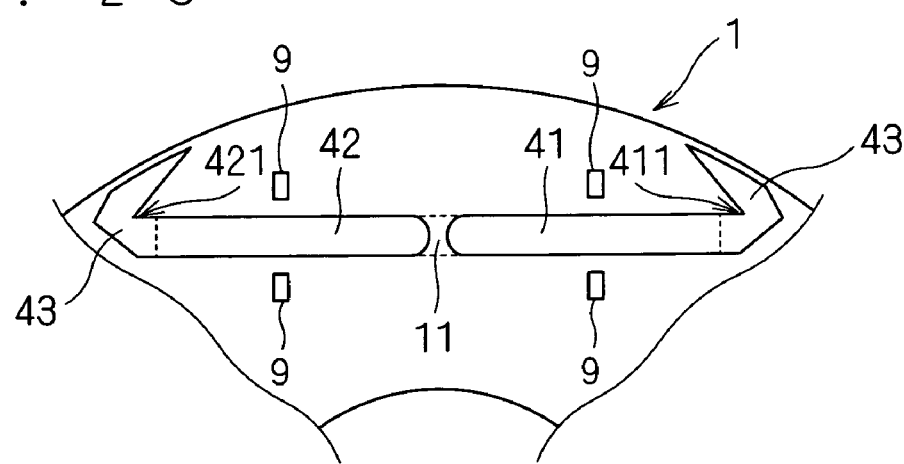
FIG. 25 is a diagram conceptually illustrating the positions of caulking 9.

FIGS. 24 and 25 conceptually illustrate the positions of caulking 9. In FIG. 24, caulking 9 is provided on both sides of the extension direction 93 of the connecting portion 11, 17, 18. Magnetic flux is not likely to short in the connecting portions 11, 17, 18, and so the connecting portions 11, 17, 18 are likely to undergo magnetic saturation. Accordingly, magnetic flux is less likely to vary on both sides of the connecting portion 11, 17, 18, and they are desirable for the positions of the caulking 9.

In FIG. 25, caulking 9 is provided in the core portions 2 and 3 in the vicinities of the centers of the field magnet through holes 41 and 42 in the one direction 94. This enhances the strength of the areas that are less strong than the vicinities of the connecting portion 11, 17, 18, i.e. this enhances the strength of the areas closer to the gaps 43 from the connecting portion 11, 17, 18.

Also, the field element core 1 may be obtained by laminating magnetic steel sheets in the given direction 91, sandwiching them with end plates from both sides in the given direction 91, and fixing the entirety with pins or bolts.

FIG. 1 conceptually illustrates the positions of holes 6 for pins or bolts. In FIG. 1, holes 6 are provided between adjacent field magnet through holes 41 and 42 belonging to different pairs, in the area closer to the inner periphery of the field element core 1 from the field magnet through holes 41 and 42. Then, when a balance weight is attached to the pins or bolts, the field element core 1 is not likely to be deformed even when the centrifugal force acting on the balance weight is transmitted to the pins or bolts.

While the invention has been described in detail, the foregoing description is in all aspects illustrative and not restrictive. It is understood that numerous other modifications and variations can be devised without departing from the scope of the invention.

The invention claimed is:

1. A field element core comprising:
    field magnet through holes that are arranged annularly in a circumferential direction around a predetermined direction along an axis of rotation, said field magnet through holes being adjacent each other in said circumferential direction and forming a pair, each of said field magnet through holes having a pair of ends in said circumferential direction; and
    a connecting portion provided between said field magnet through holes forming a same said pair, said connecting portion having, as sides, said ends that belong to different said field magnet through holes and that are adjacent each other in said circumferential direction,
    one of said sides having at least one curved portion along a circle around a position being on the side opposite to said connecting portion with respect to said one of said sides,
    a radius of said circle satisfying a ratio of not less than 1.0 nor more than 1.5 with respect to a length of said at least one curved portion in a direction perpendicular to a first extension direction in which one of said field magnet through holes extends from said correcting portion, and
    a tangent to said at least one curved portion seen from said predetermined direction along an axis of rotation being along a second extension direction of extension of said connecting portion only at one predetermined position between both ends of said at least one curved portion.

2. The field element core according to claim 1, wherein, seen from said predetermined direction along an axis of rotation, said field magnet through holes forming the same said pair all extend along one predetermined direction determined for each said pair.

3. The field element core according to claim 1, wherein said position is a middle point between positions of said both ends.

4. The field element core according to claim 1, wherein said position is shifted from a middle point between positions of said both ends toward one of said both ends.

5. The field element core according to claim 1, wherein said field element core is rotatable around said axis of rotation, and
    seen from said predetermined direction along an axis of rotation, said second extension direction is along a radius direction around said axis of rotation.

6. The field element core according to claim 2, wherein said position is a middle point between positions of said both ends.

7. The field element core according to claim 2, wherein said position is shifted from a middle point between positions of said both ends toward one of said both ends.

8. The field element core according to claim 2, wherein said field element core is rotatable around said axis of rotation, and
    seen from said predetermined direction along an axis of rotation, said second extension direction is along a radius direction around said axis of rotation.

9. The field element core according to claim 1, wherein said both ends of said at least one curved portion connect to surfaces of said one of said field magnet through holes respectively located on an outer periphery side and an inner periphery side with respect to said connecting portion.

10. The field element core according to claim 1,
    wherein, about said one of said sides seen from said predetermined direction along an axis of rotation,
    said one of said sides further comprises a plane portion that extends along a direction perpendicular to said first extension direction in which said one of said field magnet through hole extends from said connecting portion, and
    one of said ends of said at least one of curved portion connects via said plane portion to one of said surfaces located on a same side as said one of said ends of said at least one curved portion with respect to said at least one curved portion.

11. The field element core according to claim 10, wherein said one of said ends of said at least one curved portion connects directly to said plane portion.

12. The field element core according to claim 10, wherein said plane portion seen from said predetermined direction along an axis of rotation protrudes from said at least one curved portion along said first extension direction in which said one of said field magnet through holes extends from said connecting portion.

13. The field element core according to claim 10,
    wherein said at least one curved portion is a pair of curved portion, and said one of said sides has said pair of curved portions seen from said predetermined direction along an axis of rotation, and
    said plane portion is provided between said pair of curved portions.

14. The field element core according to claim 11,
    wherein said at least one curved portion is a pair of curved portion, and said one of said sides has said pair of curved portions seen from said predetermined direction along an axis of rotation, and
    said plane portion is provided between said pair of curved portions.

15. The field element core according to claim 12,
    wherein said at least one curved portion is a pair of curved portion, and said one of said sides has said pair of curved portions seen from said predetermined direction along an axis of rotation, and
    said plane portion is provided between said pair of curved portions.

16. The field element core according to claim 2, wherein said both ends of said at least one curved portion connect to surfaces of one of said field magnet through holes respectively located on an outer periphery side and an inner periphery side with respect to said connecting portion.

17. The field element core according to claim 2,
    wherein, about said one of said sides seen from said predetermined direction along an axis of rotation,
    said one of said sides further comprises a plane portion that extends along a direction perpendicular to said first extension direction in which said one of said field magnet through holes extends from said connecting portion, and
    one of said ends of said at least one curved portion connects via said place portion to one of said surfaces located on a same side as said one of said ends of said at least one curved portion with respect to said at least one curved portion.

18. The field element core according to claim 5, wherein said both ends of said at least one curved portion connect to surfaces of one of said field magnet through holes respectively located on an outer periphery side and an inner periphery side with respect to said connecting portion.

19. The field element core according to claim 5,
wherein, about said one of said sides seen from said predetermined direction along an axis of rotation,
said one of said sides further comprises a plane portion that extends along a direction perpendicular to said first extension direction in which said one of said field magnet through holes extends from said connecting portion, and
one of said ends of said at least one curved portion connects via said plane portion to one of said surfaces located on a same side as said one of said ends of said at least one curved portion with respect to said it least one curved portion.

* * * * *